United States Patent
Suzuki

(10) Patent No.: US 6,841,762 B2
(45) Date of Patent: Jan. 11, 2005

(54) COOKING UTENSIL

(75) Inventor: Akira Suzuki, Nagoya (JP)

(73) Assignee: Paloma Industries, Limited, Aichi-ken (JP)

( * ) Notice: Subject to any disclaimer, the term of this patent is extended or adjusted under 35 U.S.C. 154(b) by 37 days.

(21) Appl. No.: 09/902,330

(22) Filed: Jul. 10, 2001

(65) Prior Publication Data
US 2002/0005403 A1 Jan. 17, 2002

(30) Foreign Application Priority Data
Jul. 14, 2000 (JP) .................................. 2000-214465

(51) Int. Cl.[7] .............................................. H05B 1/02
(52) U.S. Cl. ..................................... 219/490; 219/506
(58) Field of Search ................................ 219/490, 506, 219/507, 508; 99/324, 325, 327, 331, 332, 337, 338, 339, 341, 342

(56) References Cited

U.S. PATENT DOCUMENTS

| 3,979,056 A | * | 9/1976 | Barnes ........................ 219/489 |
| 4,437,159 A | | 3/1984 | Waugh |
| 4,663,710 A | | 5/1987 | Waugh et al. |
| 4,672,540 A | | 6/1987 | Waugh et al. |
| 4,858,119 A | | 8/1989 | Waugh et al. |
| 4,913,038 A | * | 4/1990 | Burkett et al. ............. 99/329 R |
| 4,972,060 A | * | 11/1990 | Edamura ..................... 219/714 |
| 5,033,449 A | | 7/1991 | Hanagan ....................... 126/39 |
| 5,398,597 A | | 3/1995 | Jones et al. .................... 99/330 |
| 5,794,521 A | * | 8/1998 | Yung .......................... 366/144 |
| 5,934,177 A | | 8/1999 | Takeda et al. ................ 99/327 |
| 6,083,543 A | | 7/2000 | Kim et al. ................... 426/231 |

* cited by examiner

Primary Examiner—Sang Paik
(74) Attorney, Agent, or Firm—Pearson & Pearson, LLP

(57) ABSTRACT

When left and right feed switches are pressed simultaneously for three seconds at the step S1, a special mode selection screen 1 is changed such that the name of each operating mode is displayed at a display portion corresponding to the position of each of switches <1> to <4>. Thus, pressing any of the corresponding switches <1> to <4> under each display makes it possible to select each operating mode. In this way, an operation mode can be easily and reliably selected.

6 Claims, 4 Drawing Sheets

COOKING UTENSIL

BACKGROUND OF THE INVENTION

1. Field of the Invention

The present invention relates to a cooking utensil such as a fryer for performing a variety of controls by way of operation at an operating panel.

2. Description of the Prior Art

At a cooking utensil such as a fryer, there are provided a controller having a variety of operation control programs stored therein and an operating panel for instructing to execute its operation control. At this operating panel, there are provided a display portion for displaying the name of a food on the menu, time or the like and a variety of switches such as an operating switch and a cooking start switch. In a normal mode of the cooking utensil (hereinafter, referred to as a "normal mode"), when the operating switch is operated to be turned ON, the controller operates heating means, and causes the display portion to display the name of a predetermined food on the menu. When the cooking start switch is operated to be turned ON, the controller executes operation control that a cooking timer operates in accordance with a set time for each food on the menu. On the other hand, at the operating panel, parameter settings or changes for each food on the menu or a variety of settings, changes or the like irrelevant to the food on the menu are provided as a specific operating mode (hereinafter, referred to as a "special mode"). A combining operation of a plurality of switches on the operating panel is performed so that these settings, changes or the like cannot be easily achieved, thereby making it possible to change over from a current mode to an arbitrary operating mode of the special modes.

Thus, a change over to a special mode by combination of other switches has been determined for each operating mode, in the case where a large number of operating modes are present, a variety of switch combinations are made, operation becomes cumbersome, and there is a higher possibility of operation mistakes, thereby impairing usability.

SUMMARY OF THE INVENTION

The present invention has been made in order to solve the foregoing problem. It is an object of the present invention to provide a cooking utensil capable of easily and reliably selecting such an operation mode.

In order to achieve the foregoing object, according to a first aspect of the present invention, there is provided with a cooking utensil comprising a display portion for displaying a predetermined food on the cooking menu and switches to be operated during cooking, wherein said display portion enables the name of a plurality of operating mode names to be displayed by a predetermined operation of said switches, and said switches are located at the respective positions that correspond to the positions displaying the name of the operating modes, and then, said switches are operated to be turned ON, thereby making it possible to select a corresponding operating mode.

According to a second aspect of the present invention, there is provided a cooking utensil according to the first aspect, wherein the name of an operating mode displayed on the display portion can be switched by a predetermined switch operation.

According to a third aspect of the present invention, there is provided a cooking utensil according to the first and second aspects, wherein the name of the operating mode displayed at the display portion is changed according to an operating state in order to ensure use of a mode that can be or cannot be executed in the operating state because there exists an improper operating mode to be carried out according to the operating state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiment of the present invention and, together with the general description given above and the detailed description of the preferred embodiment given below, serve to explain the principle of the present invention.

DETAILED DESCRIPTION OF THE PREFERRED EMBODIMENT

Hereinafter, a preferred embodiment of the present invention will be described with reference to the accompanying drawings.

Figure 1:
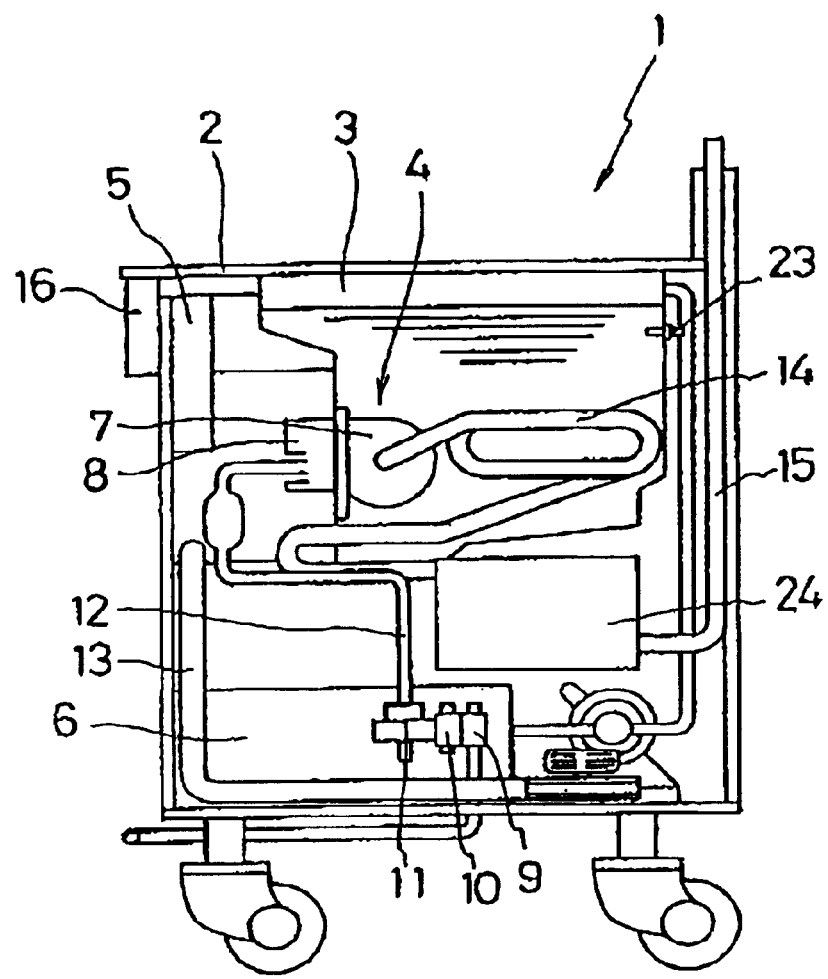
FIG. 1 is a view showing the entirety of a fryer.

FIG. 1 is an illustrative view entirely illustrating a commercial fryer (hereinafter, referred to as a "fryer") as an example of a cooking utensil. A fryer 1 is provided in a casing 2 with a pair of left and right oil vessels 3, 3 filled with cooking oil (hereinafter, referred to as "oil") for frying foods; a pulse burner 4 provided in each oil vessel 3 for heating up the oil; a controller 5 for mainly controlling combustion of the pulse burner 4; and an oil tank 6 for temporarily reserving oil in order to filtrate the oil contained in the oil vessels 3, 3.

The pulse burner 4 has a combustion chamber 7 formed in the oil vessel 3 and a mixing chamber 8 that communicates with the combustion chamber 7 outside of the oil vessel 3. The mixing chamber 8 is connected to a pipe 12 for supplying a fuel gas provided with, from the upstream side, an intake solenoid valve 9, a main solenoid valve 10, and a gas governor 11. The mixing chamber 8 is also connected to an air supply pipe 13 comprising a fan for supplying combustion air.

Further, the combustion chamber 7 is communicated with a tail pipe 14 extending through the oil vessel 3, and the tail pipe 14 is connected to an exhaust pipe 15, that opens to the outside of the fryer 1, via a de-coupler 24 at the outside of the oil vessel 3.

Figure 2:
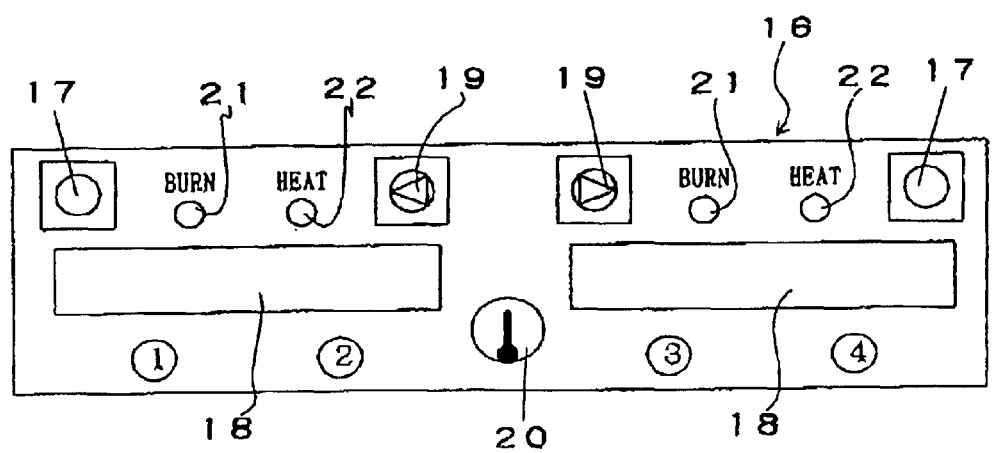
FIG. 2 is an illustrative view illustrating an operating panel.

The controller 5 comprises an operating panel 16 at the front of a casing 2. FIG. 2 is a front view showing the operating panel 16. At the operating panel 16, there are provided operating switches 17, 17; display portions 18, 18 for displaying the name of a food on the menu, time or the like; cooking start switches <1> to <4> located in pairs beneath each display portion 18 (hereinafter, referred to as a "switch <1>" or the like); and left and right feed switches 19, 19 for switching a display of the display portion 18, respectively, corresponding to each or the left and right oil vessels 3, and a thermometer switch 20 common to both of the oil vessels 3, 3 is provided between the display portions 18 and 18. Reference numerals 21, 21 denote combustion lamps, and reference numerals 22, 22 denote combustion demanding lamps. In addition, the controller 5 comprises a CPU (a central processing unit) for controlling operation of the fryer 1; a ROM having a control program stored therein; a RAM storing various types of control data; and an interface for data exchange. This CPU delivers a control command to each portion of the equipment in accordance with a program read out from the ROM, and performs processing according to data outputted from each portion of the equipment. A temperature sensor 23 provided at the oil vessel 3 and a variety of switches provided on the operating panel 16 are connected to the input side of the CPU. Each of the solenoid valves, a fan motor, various types of lamps and the like are connected to the output side of the CPU.

Therefore, in a normal mode, each switch is operated on the operating panel 16, thereby making it possible to implement normal operation control for selecting food, cooking or displaying an oil temperature For example, when a left operating switch 17 is pressed, the pulse burner 4 operates to implement ON/OFF control for switching combustion and a combustion stop by opening and closing the main solenoid valve 10 based on a signal from the temperature sensor 23, and to maintain the oil temperature in the oil vessel 3 in a predetermined range. Here, on the display portion 18, a food on the menu (for example, potato or the like) is displayed. By pressing a feed switch 19, a target food can be selected and displayed. Thereafter, when a switch <1> is pressed after putting a food in the oil vessel 3, the counting of the preset cooking time for the selected food is started. Then, when the cooking time terminates, the switch <1> blinks, and the alarm goes off, indicating that the cooking has terminated.

On the operating panel 16, apart from use in such a normal mode, use in a special mode is available to enable to set of a timer or a temperature used in a normal modes change of various names on the like. Specifically, the special mode includes: a program mode for setting parameters used for cooking of each food; a setup mode for providing various types of settings other than food, such as language setting sound-level control, or temperature calibration; a maintenance informing mode for verifying what kind of maintenance should be performed and for checking up on the completion when a maintenance time is informed in a normal mode; a maintenance time setting mode for setting time to inform maintenance; a cooking time adjustment mode for automatically measuring and adjusting a cooking time; and a boil-out mode for boiling the oil vessel 3.

Figure 3:
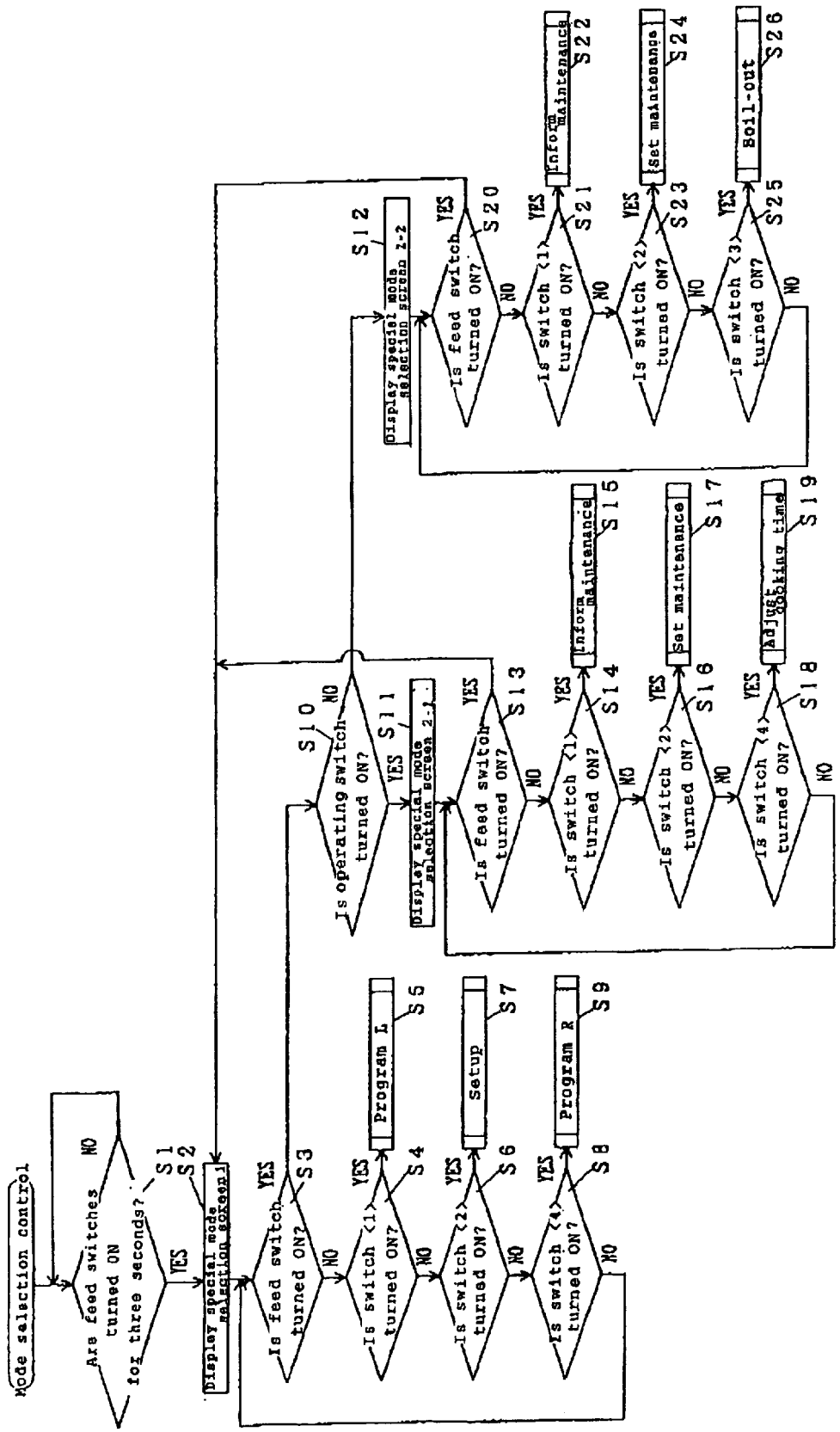
FIG. 3 is a flow chart of mode selection control.
Figure 4:
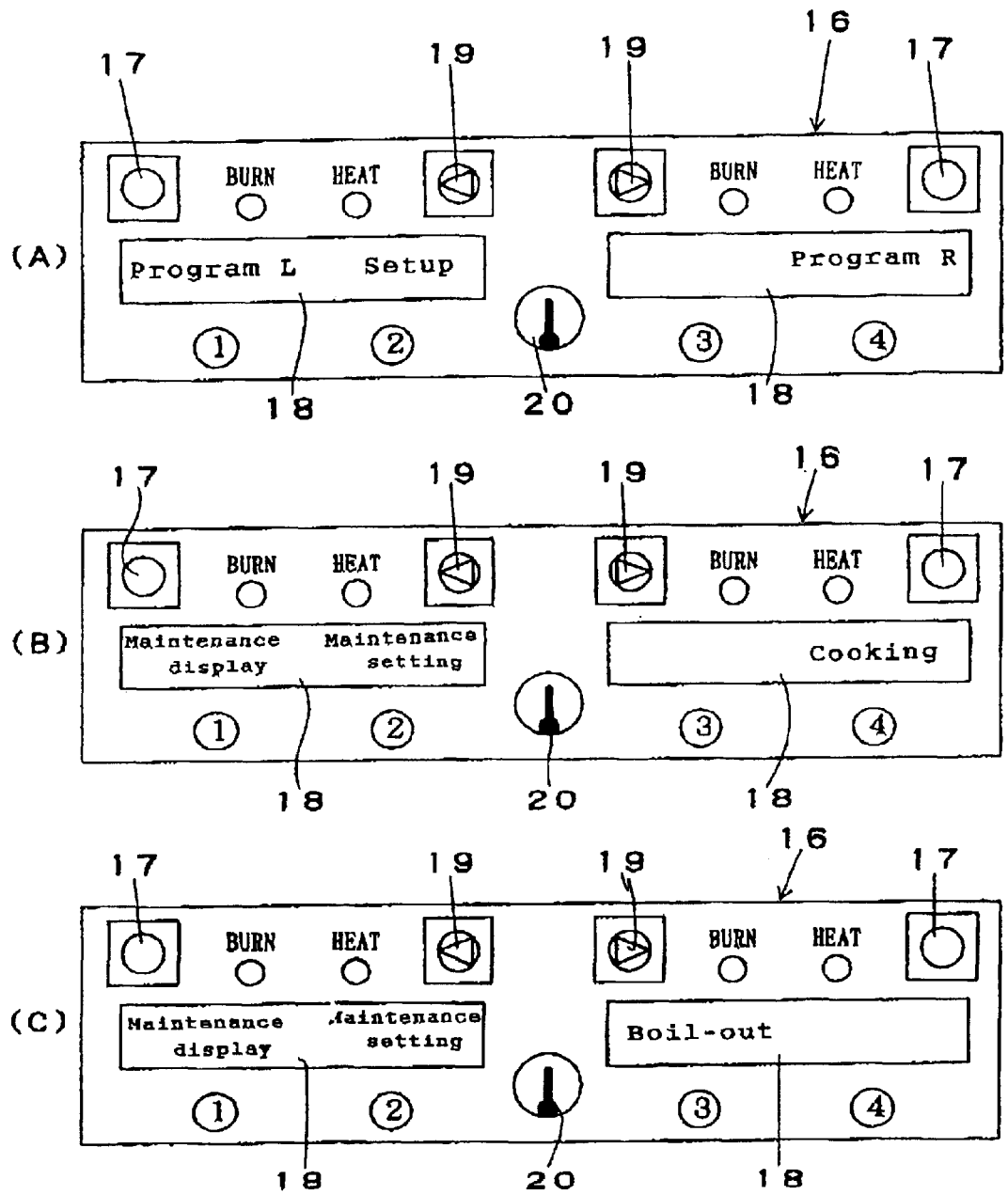
FIG. 4A is an illustrative view illustrating a display state of a specific mode selection screen 1.
FIG. 4B is an illustrative view illustrating a display state of a specific mode selection screen 2-1.
FIG. 4C is an illustrative view illustrating a display state of a specific mode selection screen 2-2.

In switching to these special modes, as shown in the flow chart of FIG. 3, when the left and right feed switches 19, 19 are first pressed simultaneously for three seconds at the step S1, a special mode selection screen 1 is displayed at the step S2. This screen, as shown in FIG. 4A, displays "program L", "setup", and "program R" at the positions that correspond to the switches <1>, <2>, and <4>. The program L indicates a program mode for the left oil vessel 3; the setup indicates a setup mode; and the program R indicates a program for the right oil vessel 3, respectively. Therefore, instead of pressing the feed switch 19 at the next step S3, any of the corresponding switches <1>, <2>, and <4> is pressed under each display, thereby each mode selection is made. That is, pressing the switch <1> (S4) makes it possible to change the setting in the left program mode L at the step S5. Pressing the switch <2> (S6) makes it possible to change the setting in the setup mode at the step S7. Pressing the switch <4> (S8) makes it possible to change the setting in the right program mode R at the step S9.

On the other hand, after the special mode selection screen 1 has been displayed at the step S2 shown in FIG. 3, when the feed switch 19 is pressed at the step S3, the current screen is changed to the special mode selection screen 2. However, according to the judgment at the step S10 whether or not switching to a special mode is performed while the operating switch 17 is ON, a special mode selection screen 2-1 (S11) indicating a maintenance informing mode, a maintenance time setting mode and a cooking time adjustment mode as shown in FIG. 4B, or a special mode selection screen 2-2 (S12) indicating the maintenance informing mode, maintenance time setting mode, and boil-out mode as shown in FIG. 4C is selected. This is because, in the cooking time adjustment mode, the operating switch 17 requires to be ON in order to adjust a cooking time while in actual operation, and, in the boil-out mode, water is put in the oil vessel 3, and is boiled, and thus, the operating switch 17 requires to be OFF so as not to be executed in a state in which the oil is present in the oil vessel 3.

Therefore, in the special mode selection screen 2-1, pressing the switch <1> (S14) makes it possible to select the maintenance informing mode at the step S15. Pressing the switch <2> (S16) makes it possible to change the setting in the maintenance time setting mode at the step S17. Pressing the switch <4> (S18) makes it possible to change the setting at the cooking time adjustment mode at the step S19. In addition, on the special mode selection screen 2-2, pressing the switch <1> (S21) makes it possible to select the maintenance informing mode at the step S22. Pressing the switch <2> (S23) makes it possible to change the setting in the maintenance time setting mode at the step S24. Pressing the switch <3> (S25) makes it possible to change the setting in the boil-out mode at the step S26.

When the special mode selection screen 2-1 or 2-2 is displayed, pressing the feed switch 19 (S13, S20) reverts to the previous special mode selection screen 1. In each of these special modes, the thermometer switch 20 is provided as a special mode termination/storage switch. Thus, when the setting change in the special mode terminates, pressing the thermometer switch 20 enables to return to a normal mode.

In this way, according to the fryer 1 in the above embodiment, the names of a plurality of operating modes in the special mode can be displayed on the display portions 18, 18 by way of simple operation of the feed switches 19, 19. In addition, the switches <1> to <4> are located at the positions that correspond to the display positions of the names of the operating modes, respectively, and the switches <1> to <4> are operated to be turned ON, thus the corresponding operating mode can be selected. Therefore a target operating mode can be easily and reliably selected.

In addition, the names of the operating modes in the special mode displayed on the display portions 18, 18 can be switched by way of operation of the feed switch 19. Thus, choices for special modes can be increased more significantly.

Further, the names of the operating mode in the special mode displayed on the display portions 18, 18 are changed according to the operating state of the fryer 1. Thus, an operating mode can be reliably selected depending on whether or not it can execute in an operating state, and a danger of incorrect operation can be eliminated.

The types or number of special modes may be changed suitably without being limited to the above embodiment. A switch other than the left and right feed switches is available for use in switch operation to change over to a special mode. In addition, a relationship between a display portion and the corresponding switch can also be modified arbitrarily without being limited to the above embodiment as long as a correlation between an operating mode display and a switch is clear.

In the above embodiment, although a description has been given by way of example in which the present invention is applied to a fryer that is operated for each of the two oil vessels, the present invention is applicable similarly even if one oil vessel is provided. Further, the present invention is also applicable to any other cooking utensil such as an oven, a grill, or a noodle boiling device as well as a fryer as long as such utensil performs mode switching operation.

Advantageous Effect of the Invention

According to an first aspect of the present invention, the names of a plurality of operating mode can be displayed by way of a predetermined switch operation, switches are located at the positions that correspond to the positions displaying the name of the operating modes, respectively, and the switches are operated to be turned ON, thus the corresponding operating mode can be selected. Therefore a target operating mode can be easily and reliably selected.

According to a second aspect of the present invention, in addition to an advantageous effect of the first aspect, the name of an operating mode displayed on the display portion can be switched by way of a predetermined switch operation, thus choices for special modes can be increased.

According to a third aspect of the present invention, in addition to advantageous effects of the first and second aspects, the name of an operating mode displayed on the display portion is changed according to an operating state of the cooking utensil, thus a mode can be reliably selected depending on whether or not it can execute in the operating state.

Additional advantages and modifications will readily occur to those skilled in the art. Therefore, the invention in its broader aspect is not limited to the specific details and representative embodiment shown and described herein. Accordingly, various modifications may be made without departing from the spirit or scope of the general inventive concept as defined by the appended claims and their equivalents.

What is claimed is:

1. A flyer comprising:

an oil vessel adapted to be filled with cooking oil;

a heater adapted to heat the oil vessel for cooking purposes;

a heat controller adapted to control the heater;

operating switches adapted to be operated for starting the heat control of the heater;

feed switches and select switches for carrying out various kinds of settings on an operating panel; and a display portion adapted to display a predetermined kind of food on a cooking menu and the names of operating modes wherein:

the fryer comprises different groups of operating modes comprising:

(a) a first group comprising first special operating modes, S3 to S9;

(b) a second group comprising second special operating modes, S13 to S19; and (c) a third group comprising third special operating modes, S20 to S26;

wherein the respective groups can only alternatively be selected if their respective starting point has been displayed on the display portion;

wherein a cooking time adjustment mode is only enabled in one special group of operating modes when an operating switch is in the ON-state, but disabled if the operating switch is in the OFF-state, and wherein a boil-out cleaning mode is only enabled in another special group of operating modes when an operating switch is in the OFF-state, but disabled if the operating switch is in the ON-state.

2. The fryer according to claim 1 wherein the maintenance information modes, S15, S22, and the maintenance time setting modes, S17, S24, are enabled irrespective of the ON-state and the OFF-state of the operating switch.

3. The fryer according to claim 1 wherein the second and third special operating modes, S11, S12, are only enabled when a feed switch is operated.

4. The flyer according to claim 2 wherein the second and third special operating modes, S11, S12, are only enabled when a feed switch is operated.

5. The fryer according to claim 1 wherein ordinary program selection, S3 to S9, is only enabled in a further special group of operating modes unless a feed switch is operated.

6. The fryer according to claim 2 wherein ordinary program selection, S3 to S9, is only enabled in a further special group of operating modes unless a feed switch is operated.

* * * * *